(12) United States Patent
Subramanya et al.

(10) Patent No.: US 12,549,520 B2
(45) Date of Patent: *Feb. 10, 2026

(54) SIGNATURE REPORTING SYSTEM AND METHOD

(71) Applicant: Sophos Limited, Abingdon (GB)

(72) Inventors: Santosh Subramanya, Bangalore (IN);
Shankar Jayaraman, Bangalore (IN)

(73) Assignee: Sophos Limited (GB)

( * ) Notice: Subject to any disclaimer, the term of this patent is extended or adjusted under 35 U.S.C. 154(b) by 231 days.

This patent is subject to a terminal disclaimer.

(21) Appl. No.: 18/072,776

(22) Filed: Dec. 1, 2022

(65) Prior Publication Data

US 2024/0137340 A1   Apr. 25, 2024
US 2024/0236043 A9   Jul. 11, 2024

(30) Foreign Application Priority Data

Oct. 19, 2022   (IN) .............................. 202211059756

(51) Int. Cl.
  *H04L 9/40* (2022.01)
  *G06F 3/0482* (2013.01)

(52) U.S. Cl.
  CPC ........ *H04L 63/0263* (2013.01); *G06F 3/0482* (2013.01); *H04L 63/20* (2013.01)

(58) Field of Classification Search
  CPC .... H04L 63/0263; H04L 63/20; G06F 3/0482
  See application file for complete search history.

(56) References Cited

U.S. PATENT DOCUMENTS

| 8,423,894 | B2 |  | 4/2013 | Bhattacharya et al. |
| 9,762,610 | B1 | * | 9/2017 | Kwan ..................... H04L 63/20 |
| 10,509,527 | B2 |  | 12/2019 | Pearl et al. |
| 12,432,257 | B2 | * | 9/2025 | Subramanya ......... H04L 63/205 |
|  |  |  |  | 726/1 |
| 2006/0117386 | A1 | * | 6/2006 | Gupta ................. H04L 63/1408 |
|  |  |  |  | 713/151 |
| 2015/0271142 | A1 | * | 9/2015 | Oliphant ................. H04L 63/02 |
|  |  |  |  | 726/12 |
| 2018/0316705 | A1 |  | 11/2018 | Tsironis |
| 2019/0334947 | A1 | * | 10/2019 | Govardhan ........... G06F 16/951 |
| 2020/0128047 | A1 | * | 4/2020 | Biswas ............... H04L 63/1425 |

(Continued)

OTHER PUBLICATIONS

Liebetrau (How to Remove False Positives in Sophos UTM's Web Application Firewall, 11 pages, May 10, 2016) (Year: 2016).*

(Continued)

*Primary Examiner* — Oleg Korsak
(74) *Attorney, Agent, or Firm* — Danielson Legal LLC

(57) ABSTRACT

Systems and methods for monitoring network activity. The methods include causing a display of a user interface to a user, wherein the user interface configured to present to the user a classification of a signature, wherein the classification of the signature is made by a firewall, and receive an input from the user to report that the firewall misclassified the signature. The methods also include receiving a report indicating that the firewall misclassified the signature based on the input received from the user; and modifying, using one or more processors executing instructions stored on memory, at least one of the signature and the firewall so that the firewall does not subsequently misclassify the signature.

16 Claims, 7 Drawing Sheets

(56) References Cited

U.S. PATENT DOCUMENTS

2021/0185084 A1\* 6/2021 Sodja .................. H04L 63/1433
2021/0377303 A1\* 12/2021 Bui ......................... G06F 40/14
2022/0156372 A1\* 5/2022 Harang ................... G06F 21/56
2024/0039890 A1\* 2/2024 Szurdi ..................... H04L 41/16

OTHER PUBLICATIONS

CISCO (User Guide for AsyncOS 11.0 for Cisco Web Security Appliances, Chapter: Notify End-Users of Proxy Actions, 23 pages, May 30, 2017) (Year: 2017).\*

Micro Focus (Micro Focus Fortify WebInspect (22.1.0) User Guide, Jul. 2022, 483 pages) (Year: 2022).\*

CISCO (Configure Intrusion Policy and Signature Configuration in Firepower, Document ID: 200451, Updated: Apr. 28, 2016, 15 pages) (Year: 2016).\*

\* cited by examiner

| Search 204 ▶ | | | | | |
|---|---|---|---|---|---|
| CATEGORY 206 ▶ | SEVERITY 208 ▶ | PLATFORM 210 ▶ | | TARGET 212 ▶ | |
| Name | SID | Category | Severity | Platform | Target | Recommended action |
| FILE-JAVA IBM Java Com.ibm.rmi.util.Proxy... [CVE-2012-4820] Sandbox Breach | 2304318 | file-java | 1 - Critical | Windows, Mac, Other | Client | Drop packet | ○ Report FP<br>○ Report FN 214<br>○ Confirm |
| FILE-PDF Adobe Acrobat Reader DC EScript.api Thermometer Object CVE-2021-28640 Use After Free | 2305837 | file-pdf | 1 - Critical | Windows, Linux, Mac | Client | Drop packet | ○ Report FP<br>○ Report FN 214<br>○ Confirm |

```
messageid="16001" log_type="Content Filtering" log_component="HTTP"
log_subtype="Allowed" fw_rule_id="4" fw_rule_name="Test"
fw_rule_section="Local rule" user="" user_group="" web_policy_id="1"
web_policy="Allow All" category="Information Technology"
category_type="Acceptable" url="http://www.example.com/" content_type=""
override_token="" src_ip="172.16.16.167" dst_ip="93.184.216.34"
protocol="TCP" src_port="64203" dst_port="80" bytes_sent="456"
bytes_received="0" domain="www.example.com" exception="" activity_name=""
reason="" user_agent="Mozilla/5.0 (Windows NT 10.0; Win64; x64)
AppleWebKit/537.36 (KHTML, like Gecko) Chrome/104.0.0.0 Safari/537.36"
status_code="0" transaction_id="" referer="" download_file_name=""
download_file_type="" upload_file_name="" upload_file_type=""
con_id="615589440" app_name="" app_is_cloud="0" override_name=""
override_authorizer="" used_quota="0"
```

*FIG. 6*

```
messageid="07002" log_type="IDP" log_component="Signatures"
log_subtype="Drop" ips_policy="" ips_policy_id="11" fw_rule_id="4"
fw_rule_name="Test" fw_rule_section="Local rule" user="" sig_id="100001"
message="fb" classification="Unknown" rule_priority="1" src_ip="172.16.16.167"
src_country="R1" dst_ip="93.184.216.34" dst_country="USA" protocol="TCP"
src_port="64203" dst_port="80" OS="All" category="Misc" victim="All"
```

*FIG. 7*

SIGNATURE REPORTING SYSTEM AND METHOD

CROSS-REFERENCE RELATED TO APPLICATION

The present application is the domestic filing of and claims the benefit of co-pending Indian Patent Application No. 202211059756, filed in India on Oct. 19, 2022.

TECHNICAL FIELD

The present application relates generally to systems and methods for monitoring network activity and, more particularly but not exclusively, to systems and methods for providing feedback on classifications of network activity

BACKGROUND

Network threats may be detected by inspection at various levels. Many threat detection technologies operate by inspecting data in various states such as in transit, in storage, in memory, during processing, or the like, and then checking whether the data matches specific criteria provided as a signature. One or more signatures can be formulated to detect one or more threats such as ransomware, malware, malformed packets, software vulnerabilities, and other such threats or combinations thereof.

Network devices such as firewalls may filter traffic based on whether a signature computed for the traffic matches a signature for known malicious activity. For example, if a network traffic signature matches a signature that is known to be associated with malicious activity, a firewall may block the network traffic. If a network traffic signature matches a signature that is known to be associated with benign network activity, or at least does not match a signature known to be associated with malicious activity, the firewall may allow the traffic.

Oftentimes, however, networks or devices thereon may misclassify network activity. For example, a firewall may classify activity as malicious, when in fact the activity is legitimate or otherwise benign. Similarly, a firewall may classify activity as non-malicious, when in fact the activity is malicious.

In some instances, users may need to contact their network support specialists to inform them of the misclassifications or to seek assistance. This often involves the user calling the support specialists, waiting on hold, and then trying to explain the issue. These processes can be time-consuming, frustrating, and ineffective.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

Embodiments herein provide systems and methods for monitoring network activity. A user interface may allow a user to view data associated with network activity. This data may include data regarding how a firewall has classified a signature associated with the activity, such as whether the firewall classified a signature as being associated with malicious activity.

Additionally, the user interface may allow a user to provide feedback to security personnel or other interested parties regarding classifications made by the firewall. For example, the user interface may include at least one selectable visual representation such as a button to allow a user to report instances in which a firewall misclassified a signature. This provides a way for user to report signature misclassifications (e.g., false positives, false negatives) and other queries without, for example, needing to call or email a support specialist.

Upon a user reporting a misclassification, security personnel or other interested parties may receive a report or otherwise an indication that the firewall misclassified a signature associated with a network activity. The embodiments herein may analyze the signature to confirm the firewall misclassified the signature. If the misclassification is confirmed, the embodiments herein may implement one or more remedial actions to prevent the firewall from subsequently misclassifying similar future signatures.

BRIEF DESCRIPTION OF DRAWINGS

Non-limiting and non-exhaustive embodiments of the invention are described with reference to the following figures, wherein like reference numerals refer to like parts throughout the various views unless otherwise specified.

FIG. 2 presents a user interface in accordance with one embodiment;

FIG. 6 presents a web activity log in accordance with one embodiment;

FIG. 7 presents a security log in accordance with one embodiment;

DETAILED DESCRIPTION

Figure 1:
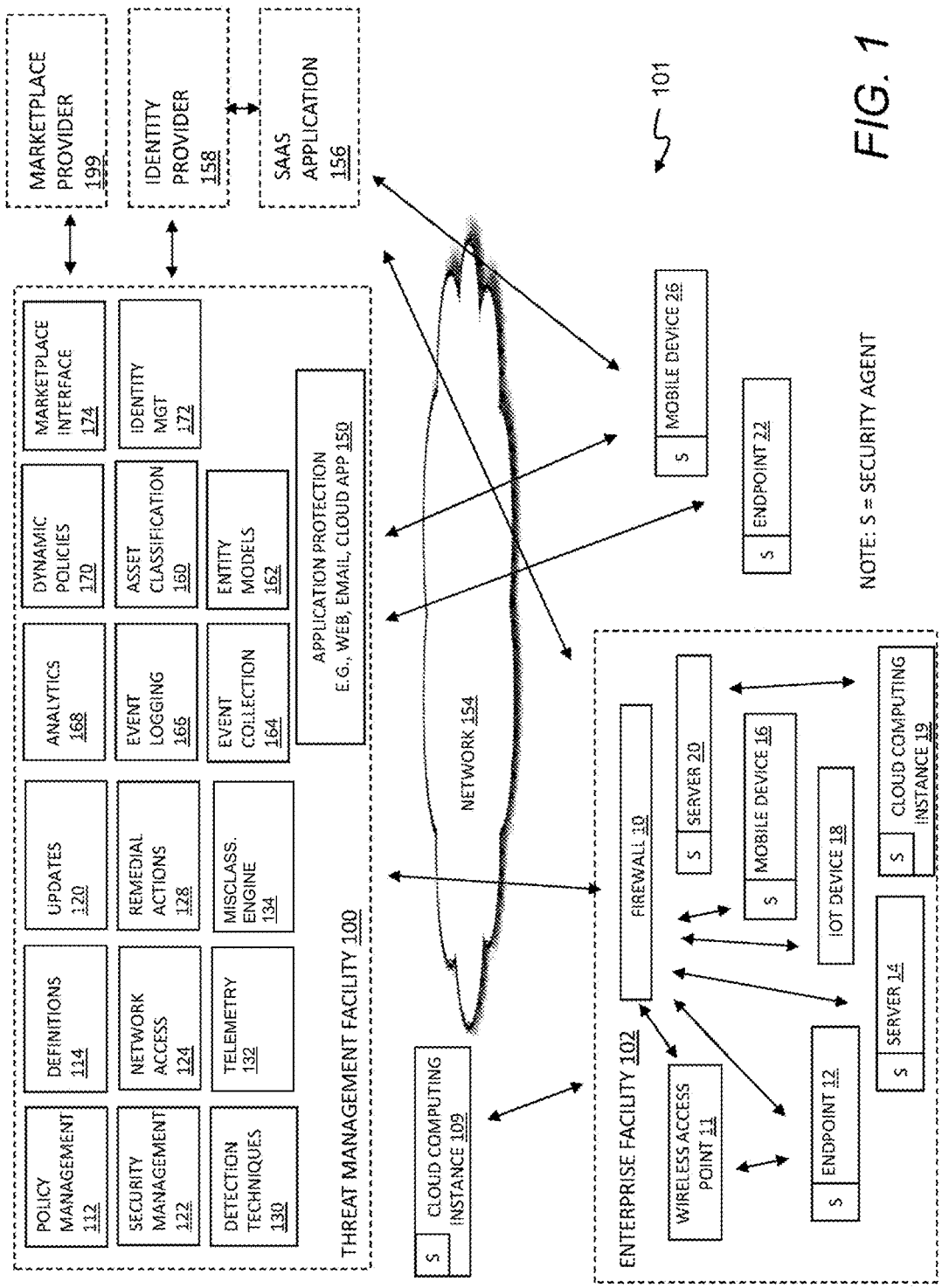
FIG. 1 illustrates a block diagram of a threat management system in accordance with one embodiment.

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Intrusion Detection Systems (IDS) or Intrusion Prevention systems (IPS) may operate by inspecting data packet(s) transmitted in network traffic. One technique is to detect predefined, malicious patterns in traffic, and block traffic if it has a signature that matches a predefined signature associated with a malicious pattern. IDS/IPS typically include a firewall device to perform these actions.

Occasionally, however, a firewall may misclassify a signature. For example, a firewall may classify a signature as being associated with malicious activity even though the signature is actually not associated with malicious activity. In this case, the classification would be a false positive. Or, a firewall may classify a signature as benign or legitimate, even though it is actually associated with malicious activity. In this case, the classification would be a false negative.

Misclassifications such as these can be burdensome if not detrimental for users. In the context of the present application, the term "user" may refer to an entity such as a personal, private, or corporate network, or administrators tasked with monitoring the same. For example, a "user may refer to security personnel tasked with protecting a corporate network from threats.

False positives can significantly disrupt a user's business as a misclassification may disrupt communications or other day-to-day operations. False negatives can be even more problematic, as malicious activity is not blocked and may therefore infect one or more network devices in furtherance of a malicious campaign.

In accordance with existing techniques, once a user notices a misclassification they may report the misclassification to the firewall provider. This reporting may involve calling, emailing, or otherwise contacting the firewall provider, which can be a time consuming, tedious, and frustrating process.

The embodiments herein provide novel systems and methods for monitoring network activity that overcome the above disadvantages. The disclosed embodiments allow users to report firewall misclassifications. In addition to or in lieu of reporting misclassifications, the embodiments herein may enable users to communicate with security personnel to, for example, submit queries regarding signatures.

The embodiments herein may cause a user interface to be presented to a user, wherein the user interface presents data regarding network activity including classifications of signatures associated with the activity made by a firewall. The user interface may also include one or more selectable visual representations to allow a user to provide feedback regarding network activity, including instances in which the firewall misclassified a signature.

Although the present application largely discusses the reporting of false positives, the embodiments herein may also enable a user to report a false negative, report detection loss for a vulnerability, submit a query related to a vulnerability or a signature, submit a request for a signature for a vulnerability, or the like.

Upon receiving notice that a firewall has misclassified a signature, the embodiments herein may first analyze the signature to confirm the misclassification. Upon confirming the misclassification, the embodiments herein may take steps to modify the firewall, the signature, or both so that the firewall does not subsequently misclassify the signature. The embodiments herein may also provide updates or otherwise allow the user to be informed regarding the progress of remediation of the misclassification.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint 12, a server 14, a mobile device 16, an appliance or Internet-of-Things (IOT) device 18, a cloud computing instance 19, and a server 20. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, a telemetry server 132, a misclassification analysis engine 134, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, macOS, OS X, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

In addition to detecting threats, the remedial action facility 128 in combination with the misclassification analysis engine 134 may take steps to ensure the firewall 10 does not misclassify a signature. This may involve modifying the signature, modifying one or more parameters or rules of the firewall 10, or some combination thereof.

The embodiments herein may cause a user interface to be presented to a user, such as a user tasked with monitoring the security of the enterprise facility 102. For example, the user may be tasked with monitoring the security of network devices such as endpoint 12, server 14, mobile device 16, IOT device 18, server 20, or other devices associated with the enterprise facility 102.

To monitor the enterprise facility 102, the user interface presented to the user may include network activity captured by the firewall 10. For example, the firewall 10 may analyze data packets associated with communications sent to and from the devices of the enterprise facility 102.

FIG. 2 presents a user interface 200 that may be presented to a user in accordance with one embodiment. The user interface 200 may include a dashboard 202 configured to present various types of data regarding network activity. For example, the dashboard 202 may present data regarding network activity that has been blocked, allowed, or otherwise detected by a firewall such as the firewall 10 of FIG. 1.

The dashboard 202 may include various fields to allow the user to search for or filter gathered data. The dashboard 202 may include a search bar or field 204 to allow a user to provide a keyword search for a particular signature, client, platform, a particular user such as an employee, a geographic location, a threat level, a target, operating system, or some other parameter.

The dashboard 202 may also include a category field 206 to sort data by file category (e.g., whether a file associated with network activity is a Portable Document Format (PDF) document, a JAVA file, etc.), a severity field 208 to sort data results by severity of a threat, a platform field 210 to sort data results by a type of platform or operating system, and a target field 212 to sort data results by the type of target. The fields 206-12 may include dropdown menus, for example, from which a user may specify a parameter of the associated field.

As seen in FIG. 2, the dashboard 202 may present to the user instances in which the firewall 10 has classified a signature or traffic associated therewith. The dashboard 202 may identify a file name, the signature identifier (SID) associated with the file, category or type of file, severity level associated with the threat, platform or operating system associated with the network activity, target or intended recipient of the traffic, and a recommended action for addressing the threat.

In operation, a firewall may misclassify a signature. For example, a firewall may classify a signature as being associated with malicious activity even though the signature is actually not associated with malicious activity. In this case, the classification would be a false positive. Or, a firewall may classify a signature as benign or legitimate, even though it is actually associated with malicious activity. In this case, the classification would be a false negative.

Misclassifications such as these can be burdensome if not detrimental for users. In the context of the present application, the term "user" may refer to an entity such as a personal, private, or corporate network, or administrators tasked with monitoring the same. For example, a "user may refer to security personnel tasked with protecting a corporate network from threats.

False positives can significantly disrupt a user's business as a misclassification may disrupt communications or other day-to-day operations. False negatives can be even more problematic, as malicious activity is not blocked and may therefore infect one or more network devices in furtherance of a malicious campaign.

Accordingly, the dashboard 202 may also include one or more selectable visual representations 214 to allow a user to report a misclassification. By reporting a misclassification, support specialists can modify the firewall or signature, or both, so that the signature is at least less likely to be misclassified in the future. In the dashboard 202 of FIG. 2, the selectable visual representations 214 include radio buttons to allow a user to report a false positive (FP), a false negative (FN), or confirmation that the firewall 10 has at least appeared to correctly classify an event.

Although the selectable visual representations 214 allow a user to perform one of three actions, in some embodiments the dashboard 202 may include more than three selectable visual representations 214 or less than three selectable visual representations. For example, in some embodiments there may be only one selectable visual representation, such as one to allow the user to report a false positive.

Radio buttons may be used in embodiments in which a user is permitted or expected to select only one option, as in FIG. 2. For example, it may not be appropriate for a user to report a false positive and a false negative for the same event. Although the selectable visual representations 214 are illustrated as radio buttons in FIG. 2, other types of representations may be used to accomplish the objectives of the embodiments herein.

Figure 3:
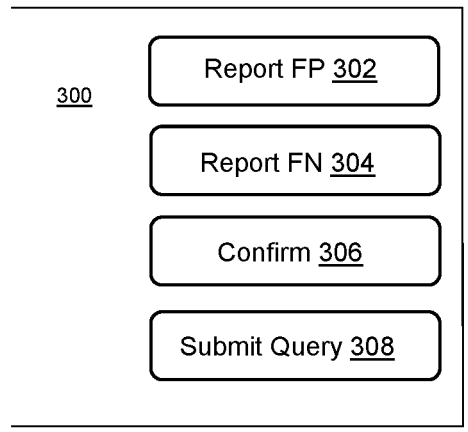
FIG. 3 presents a portion of a user interface in accordance with one embodiment.

As another example, FIG. 3 illustrates a portion of a dashboard 300 similar to the dashboard 202 of FIG. 2. The dashboard 300 may instead of radio buttons include selectable buttons 302-08. Button 302 may allow a user to report a false positive; 304, a false negative; 306, a confirmation of a classification; and 308, submit a query. Regarding button 308, a user may wish to submit to administrator or support personnel a query or otherwise a question regarding whether there is a signature available for a certain vulnerability, to report a detection loss of a vulnerability, or the like.

Figure 4:
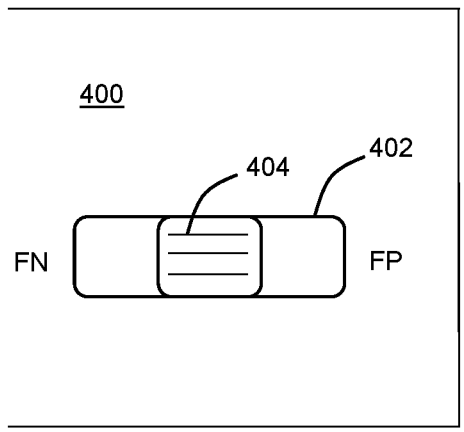
FIG. 4 presents a portion of a user interface in accordance with one embodiment.

As yet another example, FIG. 4 illustrates a portion of a dashboard 400 similar to the dashboard 202 of FIG. 2. The dashboard 400 may, instead of radio buttons, include a toggle bar 402 to accommodate a slider 404. For example, the user may select and move the slider 404 to the right to indicate a false positive, or to the left to indicate a false negative. No movement of the slider 404 may indicate that the user believes the firewall has accurately classified the signature.

In some embodiments, the selectable visual representations may be configured as checkboxes. However, checkboxes tend to be appropriate in situations in which a user is allowed to select one or more boxes. In accordance with the embodiments herein, the user may typically be expected to select only one box, possibly out of a plurality. That is, a user would not be expected to select a box indicting a false positive and also select a box indicating a false negative. Accordingly, a checkbox may be appropriate if only one checkbox is presented, such as to report a false positive.

Other embodiments may use hover-based representations to allow a user to report a misclassification. In these embodiments, a user may need to only hover a cursor element over a portion of a dashboard that is representative of a misclassification. For example, a dashboard may include a portion that is associated with a false positive. If the user hovers their cursor over this portion (e.g., for some threshold period of time), it may be construed as the user reporting a false positive.

The exact type of selectable visual representations used may vary. Other types of selectable visual representation(s), whether available now or invented hereafter, may be used in accordance with the embodiments described herein.

Figure 5:
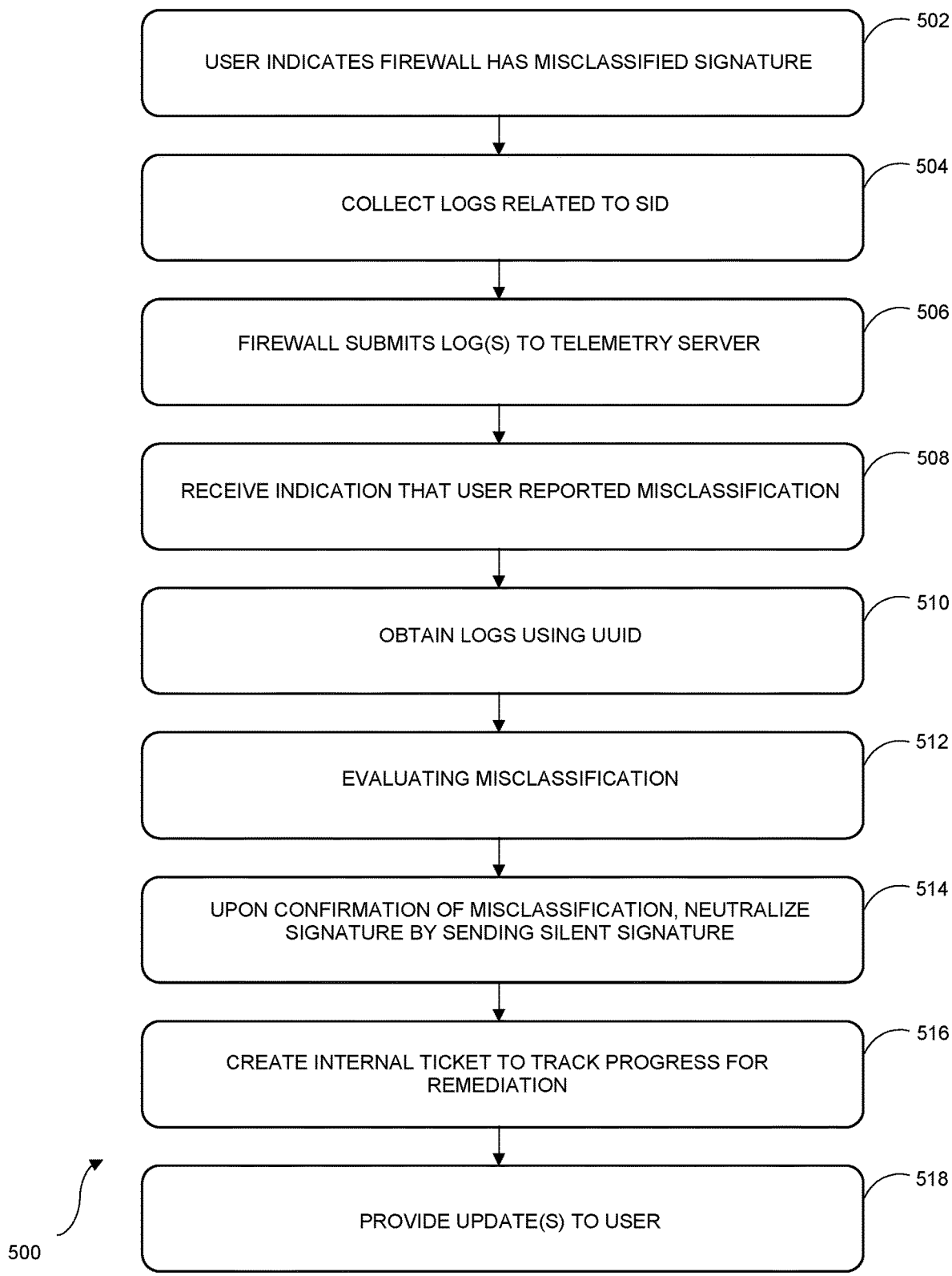
FIG. 5 depicts a flowchart of a method for reporting a false positive in accordance with one embodiment.

FIG. 5 illustrates a method 500 for reporting a false positive in accordance with one embodiment. The method 500 may be implemented by one or more of the devices, components, and/or services illustrated in FIGS. 1-2, and is discussed by way of reference thereto.

Step 502 involves a user indicating that a firewall 10 misclassified a network activity as being malicious. For example, the user may have noticed that the firewall 10 was, and/or is, blocking legitimate network traffic. More generally, the user may notice interruptions to workflows associated with their business or network.

To report the misclassification, the user may activate a selectable visual representation such as those discussed in conjunction with FIGS. 2-4. For all types of selectable visual representations, the user may be presented with a verification option to verify they intended to select the visual representation.

Step 504 involves collecting logs associated with the reported misclassification. The event collection facility 164 of FIG. 1 may collect various types of data related to the misclassified network activity associated with the user. For example, the event collection facility 164 may collect data such as the signature identifier ("SID") of the signature associated with the reported false positive, the title of the signature, a unique user identifier ("UUID") that is specific to the user, a domain associated with the sender of a communication, an internet protocol (IP) address associated with the sender, a domain associated with the intended recipient of the communication, an IP address associated with the intended recipient of the communication, a source port of the communication, a destination port of the communication, a number of bytes sent, or the like.

The event logging facility 166 of FIG. 1 may store the data collected by the event collection facility 164 in one or more logs and in a variety of formats. In storing the data, the event logging facility 166 may employ one or more security techniques to protect the data, such as through encryption, one-way hashing, or the like. For example, FIG. 6 presents a web activity log 600 including web activity data in accordance with one embodiment. The web filter log 600 includes various types of data associated with a communication such as a source IP address of the communication ("src_ip"), the destination IP address associated with the communication ("dst_ip"), the protocol used for the communication, the source port ("src_port"), the destination port ("dst_port"), the number of bytes sent in the communication ("bytes_sent"), the number of bytes received from the communication ("bytes_received"), the domain name associated with the communication, the name and type of any downloaded file(s), the name and type of any uploaded file(s), a container identifier ("con_id") that identifies a container to which data associated with the communication pertains, a Uniform Resource Identifier ("URI"), or the like.

The event logging facility 166 may store the data illustrated in FIG. 6 for reference in determining whether the firewall 10 has misclassified a signature. For example, the stored activity logs such as log 600 may be associated with a classification of "malicious" or "legitimate." If a signature under analysis includes one or more types of data or values of data that match those associated with stored, malicious logs, then the embodiments herein may conclude the analyzed signature is associated with malicious activity. Similarly, if a signature under analysis includes one or more types of data or values of data that match those associated with stored, legitimate logs, then the embodiments herein may conclude the analyzed signature is associated with legitimate activity.

FIG. 7 presents a web activity log 700 in accordance with another embodiment. The event logging facility 166 may gather data associated with the web activity log 700, which may include security-related data, and data that is similar to or different than the data of the web activity log 600 of FIG. 6.

For example, whereas the web activity log 600 includes general network activity data such as the amount of data sent, etc., the security log 700 may include data related to signatures ("sig_id"), firewall rules ("fw rule_id"), firewall name ("fw_rule_name"), country in which the communication originated ("src_country"), source IP address ("src_ip"), source port ("src_port"), destination IP address ("dst_ip"), destination port ("dst_port"), or the like. This security-related data, particularly data related to the firewall 10, may be helpful in analyzing the operation of the firewall 100 to determine what, if anything, needs modification. The logs 600 and 700 are only examples of the types of logs and associated data thereof, and other types of data in addition to or in lieu of the data of logs 600 and 700 may be used in accordance with the embodiments herein.

Step 506 involves submitting the logs to a server such as the telemetry server 132 of FIG. 1. The telemetry server 132 may correlate data stored in various logs such as the web activity log 600 of FIG. 6 and the security log 700 of FIG. 7 to generate various telemetry statistics. Telemetry statistics may refer to characteristics of a connection and may include, but are not limited to, any one or more of source IP address of a connection, destination IP address of a connection, destination port(s), source port(s), time of connection, duration of connection, counts of signature triggers across all users, counts of unique user boxes on which a signature has triggered, counts of signatures triggered for each user, or the like.

Figure 8:
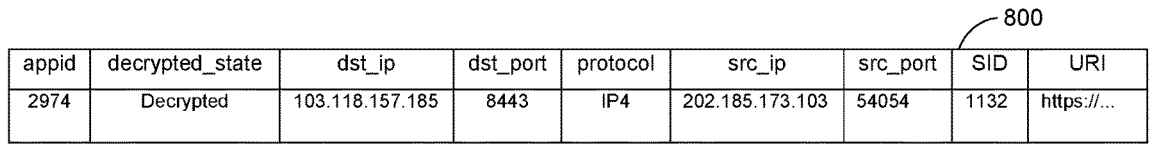
FIG. 8 presents a telemetry summary in accordance with one embodiment.

FIG. 8 presents an example of a telemetry summary 800 of data of an obtained log. The included data may include an Application Identifier assigned to a user's application ("appid"), whether content of the communication is decrypted and therefore suggests the trigger occurred after traffic was decrypted ("decrypted_state"), which may indicate that the trigger occurred after the traffic was decrypted, destination IP address ("dst_ip"), destination port ("dst_port"), protocol used, source IP address ("src_ip"), source port ("src_port"), signature identifier ("SID"), and Uniform Resource Identifier ("URI") associated with the connection.

Step 508 involves receiving an indication that the user reported a misclassification. Security personnel tasked with monitoring the operation of firewalls such as the firewall provider may receive an alert or notification that the user reported the misclassification. Security personnel may then analyze data associated with the notification, such as who reported the misclassification, the signature associated with the misclassification, or the like.

Step 510 involves obtaining the log(s) based on the unique user identifier (UUID). The UUID may refer to a user, which may be a customer of the firewall provider or a particular employee of the customer. From the UUID the embodiments herein may know which logs to extract (i.e., the logs associated with the particular UIID), the SID, the time associated with the misclassification, the source IP address associated with the connection, the destination IP address associated with the connection, source port associated with the connection, the destination port associated with the connection, or the like. Additionally, knowledge of the UUID may enable the embodiments herein to send a silent or replacement signature to only the user that reported the misclassification. However, oftentimes a silent or replacement signature is sent to other users in addition to the user that reported the misclassification.

Step 512 involves evaluating the misclassification. The misclassification analysis engine 134 of FIG. 1 may analyze various parameters associated with the misclassification. For example, the misclassification analysis engine 134 may consider, as part of the connection data, the reputation of the domain of the source or destination of the communication. This is possible because the connection data may include the data associated with the source, destination, or both.

The misclassification analysis engine 134 may reference one or more databases (not shown in FIG. 1) for reputation data regarding the domain associated with the source, destination, or both. The one or more databases may provide a rich source of domain reputation and IP reputation. This may be publicly available data or data provided by a private entity.

In the context of the present application, "IP reputation" may refer to the trustworthiness of a network location as it applies to internet communications and/or information. For example, an IP address with a "good" or "strong" reputation is a trustworthy location for internet communications and/or information.

In some instances, IP addresses associated with certain network nodes, proxy networks, botnet servers, command-and-control servers, phishing sites, and other sites hosting or otherwise associated with malware are malicious and, as such, would have a bad reputation. As traffic from these network locations may be classified generally malicious, connections from IP addresses associated with these locations may also be classified as malicious. If a signature is triggered on traffic from these types of locations, there may be a high probability that the traffic is malicious and therefore the trigger is likely accurate (i.e., a true positive).

In the context of the present application, "domain reputation" may refer to the trustworthiness of a website associated with a domain being analyzed. A domain having a "good" or "strong" reputation means the website corresponding to that address is trustworthy. These domains generally host good or benign content and are not associated with malicious, illegal, or otherwise unfavorable activity. Traffic associated with such websites or networks generally do not serve or send malicious content to clients. Accordingly, if a signature is triggered on traffic from these websites or networks, the probability of the trigger being a false positive is high.

The above-discussed reputations may help determine whether a trigger is a false positive. That is, if a signature triggers on traffic from a trusted IP address, network, or server, the probability of the trigger being a false positive is high, and the misclassification may be confirmed. Additionally, the embodiments herein may implement one or more steps of Applicant's co-pending U.S. patent application Ser. No. 17/750,737, entitled "SIGNATURE QUALITY EVALUATION" and filed on May 23, 2022, the content of which is incorporated by reference as if set forth in its entirety herein.

Step 514 involves neutralizing the signature upon confirming the misclassification. For example, the embodiments herein may neutralize the signature associated with the misclassification by sending a replacement, "silent" signature to the user or otherwise to an endpoint device to continue monitoring traffic. the replacement signature is considered "silent" in that it will not cause any alerts, but still enables the firewall 10 or other endpoint device to gather telemetry statistics regarding network activity. Accordingly, the signature may help continue to gather data regarding network activity, without the risk of issuing additional false positives or the associated alerts.

Step 516 involves creating a ticket to track the progress for the remediation or further analysis of the signature. That is, a created ticket allows interested parties (e.g., the user who reported the misclassification) to view the progress of their report as support specialists attempt to remedy the misclassification. Accordingly, the embodiments herein may periodically update the user or at least allow the user to be informed regarding the status of their reported misclassification.

Figure 9:
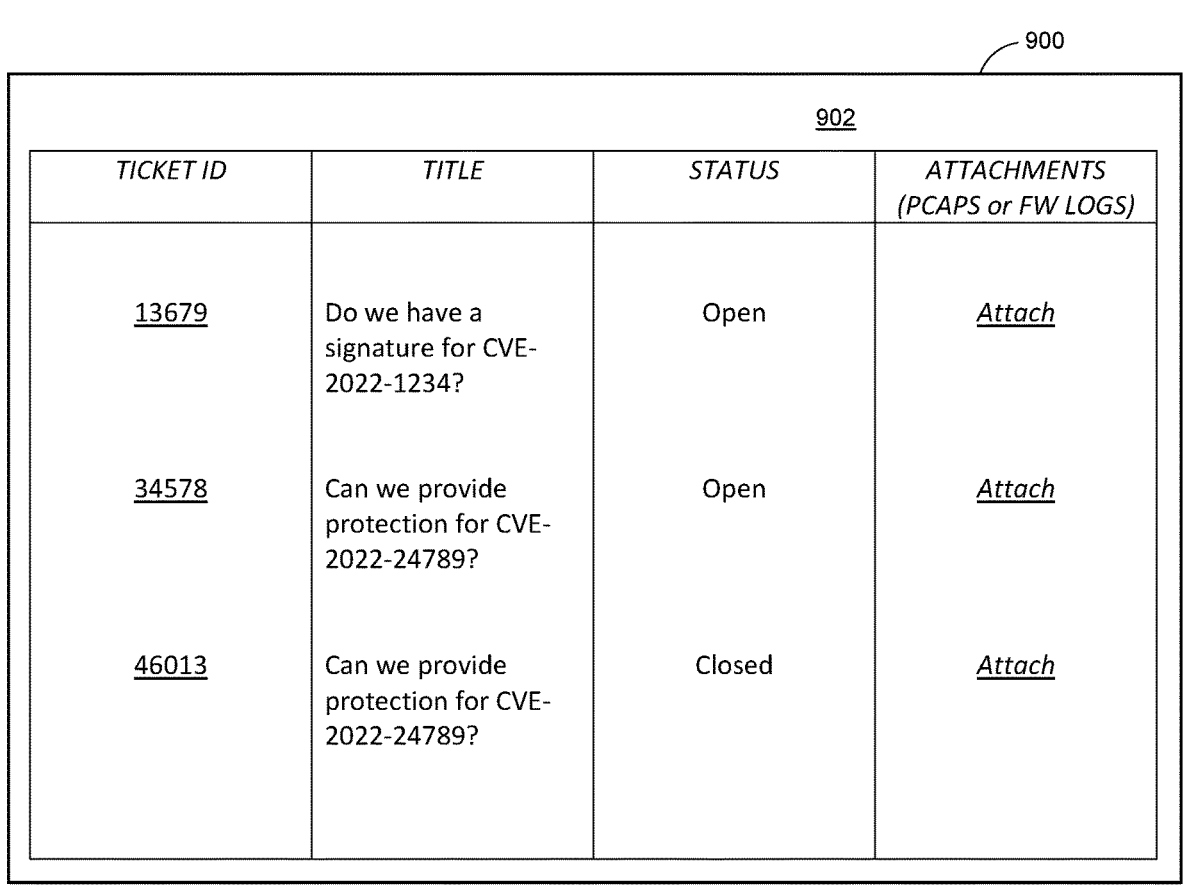
FIG. 9 presents a user interface presenting a ticket dashboard in accordance with one embodiment.

For example, FIG. 9 presents a user interface 900 presenting a ticket dashboard 902 in accordance with one embodiment. The dashboard 902 may be presented to a user and allow the user to view the status of previously-reported misclassifications or queries. For example, a user may have asked whether a signature was available for CVE-2022-1234. A ticket may be created and assigned Ticket ID 13679. A dashboard status column may indicate that this request is "Open" and therefore being addressed. The numerical labels associated with the Ticket ID numbers may include a link to allow the user to view additional details associated with the ticket. The user may also have the ability to provide attachments such as firewall logs or data regarding communicated data packets.

Step 518 involves providing an update(s) to the user. For example, the embodiments herein may communicate a message to the user each time the associated ticket's status changes. As another example, the embodiments herein may communicate updates to the user periodically such as at predetermined time intervals (e.g., daily or weekly).

Although the method 500 of FIG. 5 is discussed in the context of reporting a false positive, reporting a false negative or submitting another type of report or query may involve similar steps or processes.

Figure 10:
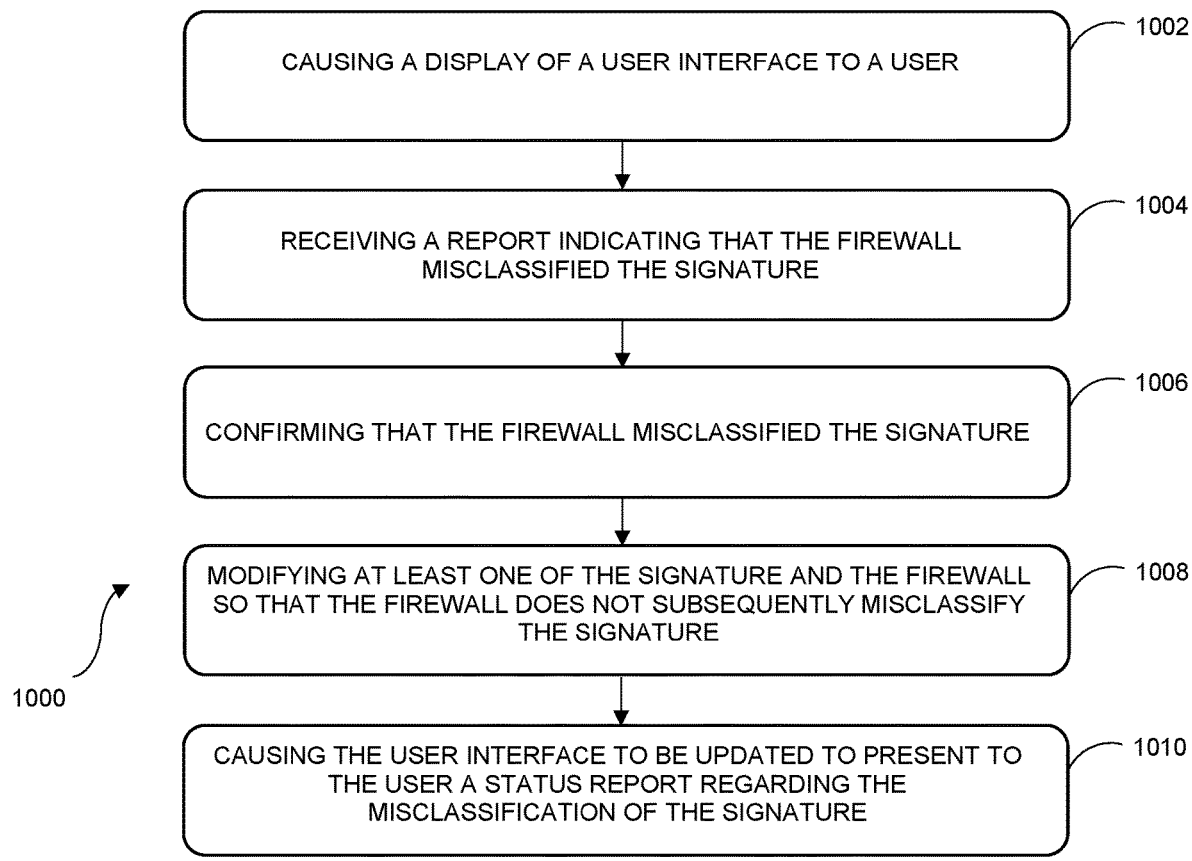
FIG. 10 depicts a flowchart of a method for monitoring network activity in accordance with one embodiment.

FIG. 10 depicts a flowchart of a method 1000 of monitoring network activity in accordance with one embodiment. The components of the threat management system 101 and, specifically, the components of the threat management facility 100 may perform the steps of method 1000.

Step 1002 involves causing a display of a user interface to a user. The user interface may be similar to the user interface 200 of FIG. 2. The presented interface may be configured to present to the user a classification of a signature, wherein the classification of the signature is made by a firewall 10. As discussed previously, the presented user interface 200 may include one or more selectable visual representations 214 to allow a user to report a firewall misclassification among other actions.

Step 1004 involves receiving a report indicating that the firewall 10 misclassified the signature based on the input received from the user. The received report may refer to a notification that the user has activated the selectable visual representation 214 to report a misclassification (e.g., a false positive).

Step 1006 involves optionally confirming, using the one or more processors, that the firewall 10 misclassified the signature by analyzing on one or more features associated with the signature. For example, the misclassification analysis engine 134 of FIG. 1 may analyze various types of data as discussed previously, such as IP address reputation data associated with the signature and domain reputation data associated with the signature.

Step 1008 involves modifying, using one or more processors executing instructions stored on memory, at least one of the signature and the firewall 10 so that the firewall 10 does not subsequently misclassify the signature. For example, the firewall 10 may be reconfigured so as to not classify the signature as malicious in the future.

Step 1010 involves optionally causing the user interface to be updated to present to the user a status report regarding the misclassification of the signature. This may allow the user to be informed of the progress of their report. The embodiments herein may communicate updates to the user periodically, and also grant the user access to a dashboard such as the dashboard 902 of FIG. 9.

As discussed above, existing techniques for reporting issues such as misclassifications by firewalls typically involve a firewall customer reaching out directly to the firewall provider for assistance. The firewall customer may need to call a support specialist associated with the firewall provider to explain the issue. This may first result in the customer being placed on hold, which can be a frustrating experience, and it also delays addressing the consequences of the misclassification.

Once the customer can communicate with the specialist, the customer must take time to explain the issue and wait for the specialist to process the request, develop a solution, and implement the solution. Accordingly, calling support specialists can be a time consuming and frustrating experience.

The embodiments herein overcome the above-described disadvantages of existing techniques and provide technical solutions in the field of network activity monitoring. First, the user interface presented to users enables them to report instances in which a firewall misclassified network activity, among other requests or queries. This ensures the reported misclassification is promptly communicated to appropriate personnel or systems, and therefore avoids the frustrating experience of needing to call or email specialists directly.

Second, the automated nature of the described embodiments allows the misclassification to be remedied more promptly than manual-based approaches. Additionally, the automated nature of the reporting process ensures the most accurate and helpful data (e.g., the SID associated with the misclassification, the time of the classification, etc.) is communicated to the appropriate personnel or systems. The allows computing resources to be used more efficiently as the embodiments herein can quickly and accurately identify the signature to be analyzed and modified.

Third, the embodiments herein may neutralize the signature associated with the classification during the analysis or modification steps. That is, the embodiments herein may neutralize the signature such that does not trip a firewall or cause an alert, but still enables the firewall or other types of endpoint devices to gather data regarding network activity. Accordingly, this ensures that networks or activity thereon is not disrupted, while also gathering data about network activity.

Fourth, by addressing misclassifications, the embodiments herein ensure that networks and devices thereon can operate as intended and are not subject to, for example, blocking communications due to false positives. Additionally, the embodiments herein may continuously receive user feedback and improve the quality of signatures, thereby enhancing network security. That is, the improved signatures can more accurately detect malicious activity such that network devices are less at risk.

Additionally, the described processes are automated. Since the process of reporting-to-neutralizing is automated, the embodiments herein can neutralize a signature quickly and prevent any further damage to network devices. This is important as it is desirable to remedy signature misclassifications as soon as possible and, namely, before malicious activity is able to harm network devices.

In one aspect, embodiments relate to a method for monitoring network activity. The method includes causing a display of a user interface to a user, the user interface configured to present to the user a classification of a signature, wherein the classification of the signature is made by a firewall, and receive an input from the user to report that the firewall misclassified the signature; receiving a report indicating that the firewall misclassified the signature based on the input received from the user; and modifying, using one or more processors executing instructions stored on memory, at least one of the signature and the firewall so that the firewall does not subsequently misclassify the signature.

In some embodiments, the method further comprises confirming, using the one or more processors, that the firewall misclassified the signature by analyzing one or more features associated with the signature. In some embodiments, the one or more features include internet protocol (IP) address reputation data associated with the signature and domain reputation data associated with the signature.

In some embodiments, modifying the signature includes assigning a silent tag to the signature to neutralize the signature, transmitting the neutralized signature to the user, and receiving telemetry data based on the neutralized signature.

In some embodiments, the user interface includes at least one selectable visual representation to allow the user to report that the firewall misclassified the signature.

In some embodiments, the misclassification of the signature is based on a false positive of the signature being malicious.

In some embodiments, the misclassification of the signature is based on a false negative of the signature being malicious.

In some embodiments, the method further includes causing the user interface to be updated to present to the user a status report regarding the misclassification of the signature.

In some embodiments, the user interface is further configured to allow the user to submit a query related to a vulnerability or a signature.

According to another aspect, embodiments, relate to a system for monitoring network activity. The system includes one or more processors executing instructions stored on memory to: cause a display of a user interface to a user, wherein the user interface is configured to present to the user a classification of a signature, wherein the classification of the signature is made by a firewall, and receive an input from the user to report that the firewall has misclassified the signature; receive a report indicating that the firewall misclassified the signature based on the input received from the user; and modify at least one of the signature and the firewall so that the firewall does not subsequently misclassify the signature.

In some embodiments, the one or more processors are further configured to execute instructions stored on memory to provide a misclassification analysis engine to confirm that the firewall misclassified the signature by analyzing one or more features associated with the signature. In some embodiments, the one or more features include internet protocol (IP) address reputation data associated with the signature and domain reputation data associated with the signature.

In some embodiments, the one or more processors modify the signature by assigning a silent tag to the signature to neutralize the signature, transmitting the neutralized signature to the user, and receiving telemetry data associated based on the neutralized signature.

In some embodiments, the user interface includes at least one selectable visual representation to allow the user to report that the firewall misclassified the signature.

In some embodiments, the misclassification of the signature is based on a false positive of the signature being malicious.

In some embodiments, the misclassification of the signature is based on a false negative of the signature being malicious.

In some embodiments, wherein the one or more processors are further configured to cause the user interface to be updated to present to the user a status report regarding the misclassification of the signature to the user.

In some embodiments, the user interface is further configured to allow the user to submit a query related to a vulnerability or a signature.

According to yet another aspect, embodiments relate to a computer program product for monitoring network activity, the computer program product comprising computer executable code embodied in one or more non-transitory computer readable media that, when executing on one or more processors, performs the steps of causing a display of a user interface to a user, the user interface configured to: present to the user a classification of a signature, wherein the classification of the signature is made by a firewall, and receive an input from the user to report that the firewall misclassified the signature; receiving a report indicating that the firewall misclassified the signature based on the input received from the user; and modifying at least one of the signature and the firewall so that the firewall does not subsequently misclassify the signature.

In some embodiments, the computer program product further comprises computer executable code that, when executing on one or more processors, performs the step of confirming that the firewall misclassified the signature by analyzing one or more features associated with the signature.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for monitoring network activity, the method comprising:
   causing a display of a user interface to a user, the user interface configured to:
      present a search bar or field to receive a request for a signature, wherein the request includes a keyword search identifying the signature;
      present to the user a classification of the signature, wherein the classification of the signature is made by a firewall,
      present a selectable visual representation to allow the user to report that the firewall misclassified the signature, and
      receive an input from the user to report that the firewall misclassified the signature, wherein the input comprises the activation of the selectable visual representation;
   receiving a report indicating that the firewall misclassified the signature based on the input received from the user;
   collecting logs associated with the reported misclassification and the user;
   referencing stored activity logs that are each associated with a classification of malicious or a classification of legitimate;
   determining whether the collected logs associated with the reported misclassification and the user include one or more types of data or values of data that match those associated with stored activity logs that are classified as legitimate;
   confirming the firewall misclassified the signature based on the determination that the collected logs associated with the reported misclassification and the user include one or more types of data or values of data that match those associated with stored activity logs that are classified as legitimate; and
   modifying, using one or more processors executing instructions stored on memory, at least one of the signature and the firewall so that the firewall does not subsequently misclassify the signature.

2. The method of claim 1 further comprising confirming, using the one or more processors, that the firewall misclassified the signature by analyzing one or more features associated with the signature.

3. The method of claim 2 wherein the one or more features include internet protocol (IP) address reputation data associated with the signature and domain reputation data associated with the signature.

4. The method of claim 1 wherein modifying the signature includes:
   assigning a silent tag to the signature to neutralize the signature,
   transmitting the neutralized signature to the user, and
   receiving telemetry data associated based on the neutralized signature.

5. The method of claim 1 wherein the misclassification of the signature is based on a false positive of the signature being malicious.

6. The method of claim 1 further comprising causing the user interface to be updated to present to the user a status report regarding the misclassification of the signature.

7. The method of claim 1 wherein the user interface is further configured to allow the user to submit a query related to a vulnerability.

8. A system for monitoring network activity, the system comprising:
- one or more processors executing instructions stored on memory to:
  - cause a display of a user interface to a user, wherein the user interface is configured to:
    - present a search bar or field to receive a request for a signature, wherein the request includes a keyword search identifying the signature,
    - present to the user a classification of a signature, wherein the classification of the signature is made by a firewall,
    - present a selectable visual representation to allow the user to report that the firewall misclassified the signature, and
    - receive an input from the user to report that the firewall has misclassified the signature, wherein the input comprises the activation of the selectable visual representation;
  - receive a report indicating that the firewall misclassified the signature based on the input received from the user;
  - collect logs associated with the reported misclassification and the user;
  - reference stored activity logs that are each associated with a classification of malicious or a classification of legitimate;
  - determine whether the collected logs associated with the reported misclassification and the user include one or more types of data or values of data that match those associated with stored activity logs that are classified as legitimate;
  - confirm the firewall misclassified the signature based on the determination that the collected logs associated with the reported misclassification and the user include one or more types of data or values of data that match those associated with stored activity logs that are classified as legitimate; and
  - modify at least one of the signature and the firewall so that the firewall does not subsequently misclassify the signature.

9. The system of claim 8 wherein the one or more processors are further configured to execute instructions stored on memory to provide a misclassification analysis engine to confirm that the firewall misclassified the signature by analyzing one or more features associated with the signature.

10. The system of claim 9 wherein the one or more features include internet protocol (IP) address reputation data associated with the signature and domain reputation data associated with the signature.

11. The system of claim 8 wherein the one or more processors modify the signature by:
- assigning a silent tag to the signature to neutralize the signature,
- transmitting the neutralized signature to the user, and
- receiving telemetry data associated based on the neutralized signature.

12. The system of claim 8 wherein the misclassification of the signature is based on a false positive of the signature being malicious.

13. The system of claim 8 wherein the one or more processors are further configured to cause the user interface to be updated to present to the user a status report regarding the misclassification of the signature to the user.

14. The system of claim 8 wherein the user interface is further configured to allow the user to submit a query related to a vulnerability.

15. A computer program product for monitoring network activity, the computer program product comprising computer executable code embodied in one or more non-transitory computer readable media that, when executing on one or more processors, performs the steps of:
- causing a display of a user interface to a user, the user interface configured to:
  - present a search bar or field to receive a request for a signature, wherein the request includes a keyword search identifying the signature;
  - present to the user a classification of the signature, wherein the classification of the signature is made by a firewall,
  - present a selectable visual representation to allow the user to report that the firewall misclassified the signature, and
  - receive an input from the user to report that the firewall misclassified the signature, wherein the input comprises the activation of the selectable visual representation;
- receiving a report indicating that the firewall misclassified the signature based on the input received from the user;
- collecting logs associated with the reported misclassification and the user;
- referencing stored activity logs that are each associated with a classification of malicious or a classification of legitimate;
- determining whether the collected logs associated with the reported misclassification and the user include one or more types of data or values of data that match those associated with stored activity logs that are classified as legitimate;
- confirming the firewall misclassified the signature based on the determination that the collected logs associated with the reported misclassification and the user include one or more types of data or values of data that match those associated with stored activity logs that are classified as legitimate; and
- modifying at least one of the signature and the firewall so that the firewall does not subsequently misclassify the signature.

16. The computer program product of claim 15 wherein the computer program product further comprises computer executable code that, when executing on one or more processors, performs the step of confirming that the firewall misclassified the signature by analyzing one or more features associated with the signature.

* * * * *